Oct. 28, 1969     P. C. SETZLER     3,474,701
PRELOAD INDICATING DEVICES FOR FASTENERS
Filed May 24, 1968     2 Sheets-Sheet 1
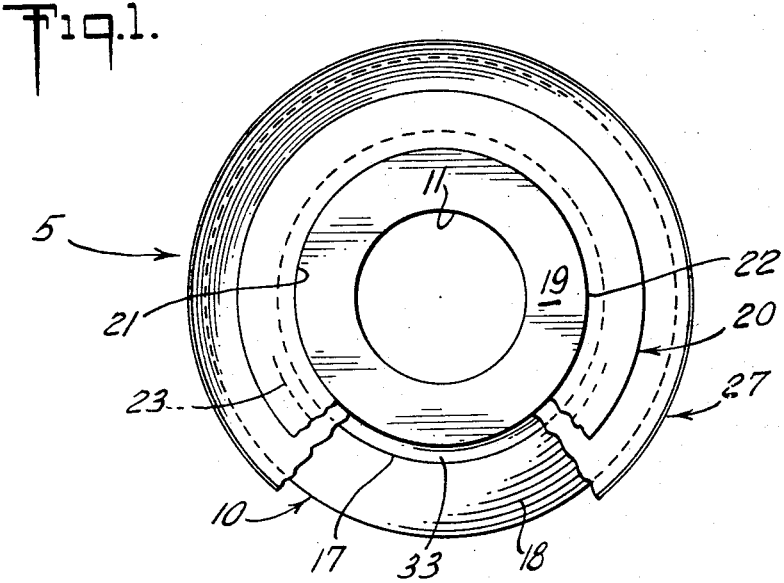
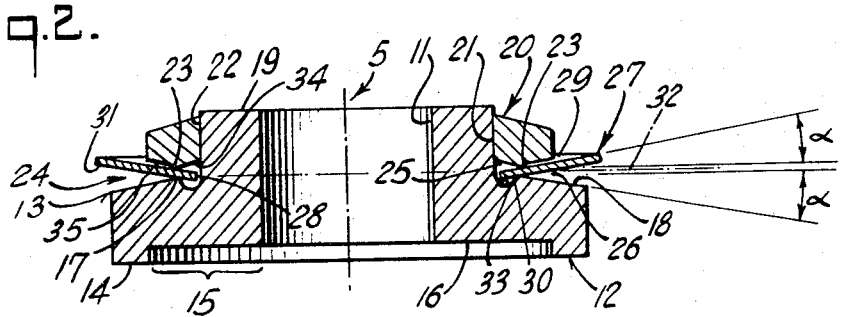
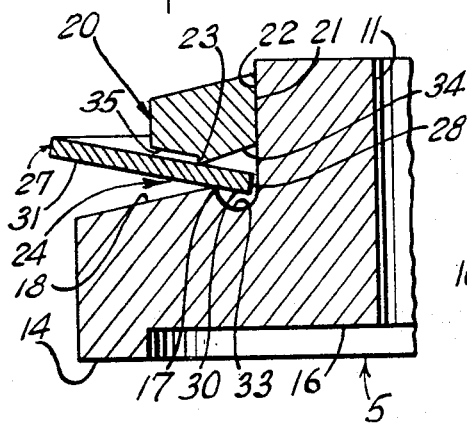
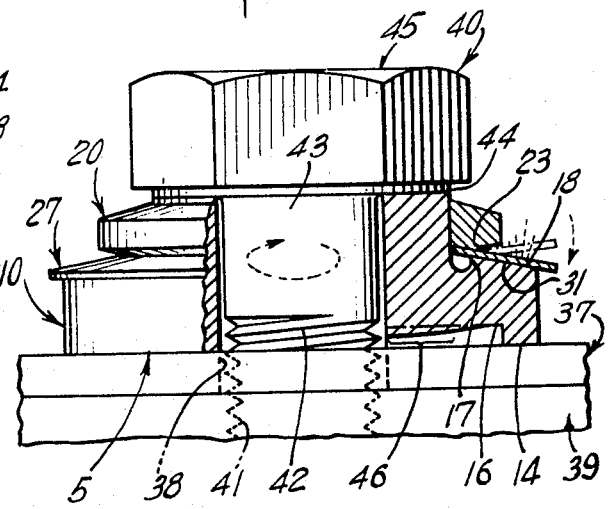

Oct. 28, 1969 P. C. SETZLER 3,474,701
PRELOAD INDICATING DEVICES FOR FASTENERS
Filed May 24, 1968 2 Sheets-Sheet 2

United States Patent Office 3,474,701
Patented Oct. 28, 1969

3,474,701
PRELOAD INDICATING DEVICES
FOR FASTENERS
Paul C. Setzler, Sherman, Conn., assignor to Heli-Coil
Corporation, Danbury, Conn., a corporation of
Delaware
Filed May 24, 1968, Ser. No. 731,932
Int. Cl. F16b 31/02
U.S. Cl. 85—62                                    9 Claims

ABSTRACT OF THE DISCLOSURE

Improved preload indicating devices for fasteners, e.g., of the bolt and stud types, each of which embodies an elongated shank for clamping parts or connecting faying surfaces thereof together. Forms of the improved preload indicating device may be embodied to advantage in the head or nut of such a fastener, or in a washer structure therefor. The head, nut or washer is characterized by a body of deflectable metallic material having a leading end to transfer clamping force to such parts and an opposite back end. The leading end is provided with an annular bearing land to contact the opposed one of the parts for applying clamping force. This annular bearing land is arranged about an annular set back zone having a transverse face, an inner annular section of which is to be deflected forward the opposed part upon application of an ideal degree of preload, but short of contacting this opposed part.

The body back end carries an annular fulcrum and an axial extension projecting through this fulcrum. An annular support or collar is fixedly mounted on the extension in an axially adjusted position dictated by the critical amount of preload to be applied in service, and its leading side carries another annular fulcrum of different diameter spaced axially from and opposed to the first fulcrum to define an intervening space. A cupped, bi-stable Belleville washer is loosely mounted about the extension within the space intervening the opposed fulcrums.

As the body is progressively deflected axially in service by application of preload to the critical amount thereof the fulcrums are caused to approach each other to a degree that stresses the Belleville washer sufficiently to cause it to snap over center, so as to indicate imposition of the critical amount of preloading. The fulcrum of lesser diameter is flanked by an annular surface against which the Belleville washer will slap as it snaps over, so as to provide an enhanced audible indication, supplementing the amplified visual and tactile indications provided by gross washer deflection, of attainment of the critical degree of preloading.

---

The present invention relates to preload indicating devices for use with fasteners, which may be of the bolt and stud types, each characterized by an elongated fastener shank for clamping parts together and equipped with a plurality of axially-spaced anchoring means for applying adjustable clamping load to such parts, a certain one of the clamping means comprising any of a nut, a bolt head, a washer, and the like. The preload indicating device of the present invention is embodied in this certain one of the clamping means.

Prior to the present invention it was proposed in the prior art to embody a preload indicating device in a washer assembly for use with such bolts or studs. Examples of such prior art proposals are disclosed in the Waisman U.S. Patent No. 3,323,403 of June 6, 1967. A helpful discussion of prior art practices and problems are set forth in the specification of this patent. However, it is made clear therein that preload indicating washers of the types described in this Waisman patent may provide only visual and tactile indications and not a desirable audible indication. Further, such an indicating device is not reusable since the bolt load is directly applied through the indicating washer assembly, an element of which is plastically deformable. Also, in the use of such a washer indicating assembly it is difficult to determine the exact point in the preload application when the assembly is properly loaded.

The prior U.S. patent to Ralston 2,850,937 of Sept. 9, 1958, proposes a particular type of preload indicating washer which is in the form of a square Belleville washer that is also used in the fastener assembly as the load bearing element. This Belleville washer is not of a bi-stable type, i.e., it does not snap over center or through an intermediate planar position of balanced stressing, but of the constant load type merely to deflect from an initial cup shape to a substantially flat plate which may be slightly concaved in the opposite direction upon application of full bolt load, whereby the change in shape or the ultimate deflection is intended to indicate the imposition of the full amount of the bolt preloading for which it is designed. Further, the Ralston indicator does not visually signal accurately when the desired critical load has been applied to the fastener assembly. It is not unlikely that overload may be applied in tightening up the bolt.

These and other problems of prior art proposals are effectively solved by the preload indicating device of the present invention.

The preload indicating device of the present invention is designed for use with or embodiment in fasteners, such as of the bolt and stud types which are characterized by an elongated fastener shank for clamping parts together between a plurality or pair of axially-spaced anchoring means associated with this shank with a certain one of the clamping means comprising any of a nut, a bolt head, a washer, and the like. This certain clamping means includes a body of deflectable metallic material that is elastically deformable in use so as to permit reuse of embodiments of the invention. This deflectable body has opposite ends and an axis extending centrally therethrough in the direction of the clamping load to be applied. The leading one of these ends is arranged transversely, i.e., generally normal to this body axis, and is adapted to transfer clamping force to one of the parts to be fastened together. This force transfer end has a circumambient, part-opposed, bearing means circumscribing the body axis and spaced radially outward therefrom. This circumscribing bearing means is flanked on its inner side by a circumambient, set back surface zone of appreciable radial width that is located axially back of the circumambient bearing means to be moved forward by a predetermined load deflection of the body toward but short of contact of the surface against which the bearing means seated.

On the back other end of this body is provided a first circumambient fulcruming means circumscribing the body axis at a certain radial distance from the latter, and this fulcruming means extends rearwardly in the axial direction. This back end of the body also carries a transversely-arranged support means that circumscribes the body axis, with this support means being fixedly connected in an axially adjusted position to the body back end radially inward of the first fulcruming means that is provided on the latter. Also, this support means is located axially back of and spaced from the first fulcruming means. This support means carries on the leading side thereof a second circumambient fulcruming means in opposed and axially-spaced relation to the first fulcruming means and it is likewise circumscribed about the body axis at a radial distance from the latter different from the certain radial distance location of the first fulcruming means.

The opposed and axially-spaced first and second circumambient fulcruming means together with the body back end and the support means which respectively carry them define therebetween a transversely-arranged, circumambient indicator space having a radially-inward margin of a transverse dimension appreciably less than the transverse dimension of the innermost located fulcruming means, so as to define, to radially oposite sides of the latter, an inner zone and an outer zone of the indicator space. A bi-stable, dished, Belleville indicator washer, which has a central hole, a concave side and inner and outer circumambient zones located on opposite sides of a transverse central plane, is mounted in the indicator space about the body axis with opposite faces of this indicator washer being opposed respectively to the first and second fulcruming means for transverse flexure in opposite directions of the inner and outer circumambient zones thereof toward the transverse central plane.

When the body is progressively loaded axially the opposed fulcruming means are moved axially progressively toward each other so that the bi-stable Belleville washer is progressively stressed to cause flexure of the inner and outer zones thereof respectively in opposite directions so that, when the loading has progressed to the point of predetermined preload, these washer zones then will snap simultaneously through center to opposite sides. This snapping of the inner and outer zones of the Belleville washer through the transverse central plane provides quite precisely both visual and tactile, as well as highly important audible indications of attainment of the predetermined desirable preload.

In order to enhance the audible indication of such attainment of the predetermined preload, at least one of the body back end and the leading side of the support means is provided with stop means radially offset from the fulcruming means carried thereby and this stop means is located in the path of one of the flexed zones of the bi-stable Belleville washer for audible slap of this flexed zone thereagainst when the latter is snapped through center. If a single such stop means to provide the audible slap is employed, or if a plurality thereof is provided at least one of them is located on whichever of the body back end and the support means carries the radially innermost fulcruming means.

It is an object of the invention to provide the parts of embodiments of the present preload indicating device in forms permitting their ready assembly in a very simple manner that easily attains a preset relationship for certain service which assures unusually accurate signalling of the application of the correct amount of initial loading in placing it in such service without imposition of such load to the signalling mechanism thereof, and which desirably permits reuse of such embodiments with like accuracy of their signalling operations. Accuracy is achieved by calibration during the assembly of the parts and is not dependent upon the mechanical dimensions of the parts or the properties thereof.

It is also an object of the present invention to provide simple, accurate and economical means to determine actual clamping load imposed by a variety of forms of fasteners of the indicated types, so that they will not, when installed, be either overloaded to fracture or under stressed, whereby inherent tendencies of the latter in service to come apart or to fail prematurely by fatigue are effectively avoided.

Another object of the invention is to eliminate in a simple manner a necessity for resorting to the highly inaccurate method of determining actual clamping load by the turn of the nut method, and of others which relate tightening torque to axial load without taking into account the variations of frictional forces inherent in different assemblies.

An additional object is to avoid effectively the excessive costs characteristic of measuring by instruments bolt elongation with reference to pins mounted at considerable expense in axial holes provided in the bolts, of the uses of strain gages and force measuring washers which also require instrumentation, and of the employment of expensive torque wrenches.

A further object of the invention is to attain by the use of forms thereof reliable accuracy within ±5% of the ideal preloading for any particular assembly embodying fasteners of the indicated types, an economy which can be realized by such use due to the reusability thereof, the desirable advantage of permitting checking for accuracy prior to use, and the elimination of need for instrumentation or special wrenches.

Other objects of the invention will in part be obvious and will in part appear from reference to the following detailed description taken in connection with the accompanying drawings, wherein like numerals identify similar parts throughout, and in which:

FIG. 1 is a top plan view, to enlarged scale, of a washer embodiment of the present preload indicating device invention, with parts broken away;

FIG. 2 is an axial section of the device shown in FIG. 1;

FIG. 3 is a sectional detail, with parts broken away, to still larger scale than that of the FIGS. 1 and 2 embodiment;

FIG. 4 is a side elevational view, with parts broken away and in section, of an assembly of a stud of conventional form, the washer embodiment of the preload indicating device of the present invention shown in FIGS. 1 to 3 incl. and a pair of parts clamped together thereby;

Figure 7:
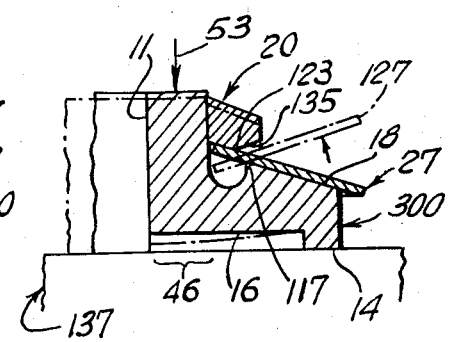
Figure 8:
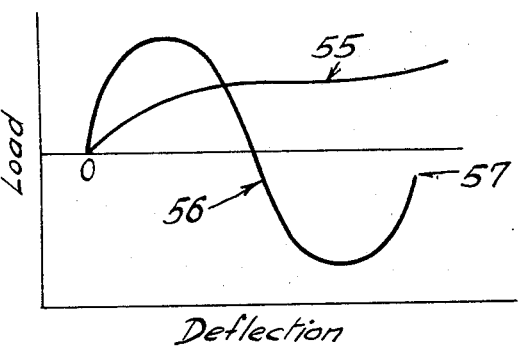

FIG. 7 is a sectional detail, with parts broken away and omitted, illustrating a modified form of the washer embodiment shown in FIGS. 1 to 4 incl., and indicating in broken lines relative positions of parts when predetermined preload is imposed thereon by an assembly of a bolt or stud to clamp parts together; and FIG. 8 is a graph illustrating load-deflection diagrams of the Belleville bi-stable washer employed in the present invention and of a single action, constant load Belleville washer proposed in the prior art.

In the washer embodiment of the present invention illustrated in FIGS. 1 to 4 incl. the preload indicating device 5 includes a washer body 10 of deflectable metallic material, such as suitably hardened steel of an elasticity which will permit after loading deformation, return thereof to original shape upon unloading. In this preferred form of the washer embodiment such body 10 all parts thereof are of annular form concentrically arranged about a central axis.

The body 10 has a through cylindrical bore 11. The main portion of this body 10 has a leading end 12 arranged transversely, generally normal to the body axis, which is adapted to transfer clamping force to one of a plurality or pair of juxtaposed parts, and an opposite back end 13. The force transfer end 12 has a circumambient, part-opposed, bearing means circumscribing the body axis, in the form of an annular bearing face zone 14 which is arranged annularly about a circumambient, set back zone 15 of appreciable radial width, so as to intervene the body axis and the annular bearing face 14. This annular, set back zone 15 has a transverse face 16 that is spaced radially inward from and located axially back of the annular bearing face 14, and which is adjacent to or flanking the through bore 11, as will be more fully understood from the following description of action of parts under applied load described in connection with FIG. 4.

Means on the back end 13 define a first circumambient fulcruming means, preferably in the form of a circular rib 17, circumscribing the body axis at a certain radial distance from the latter and extending rearwardly in the axial direction, as will be seen from FIGS. 2, 3 and 4. This annular fulcruming rib 17 is flanked on its outer side, preferably by an annular frusto-conical surface 18 for a purpose to be indicated hereinafter. The back end 13 of the washer body 10 is provided with a coaxial, cylindrical extension 19 that is aligned with the annular, set back surface 16. A transversely-arranged support means, preferably in the form of an annular collar 20, provided with a through bore 21, is press fitted down or otherwise secured upon the cylindrical surface 22 of this extension 19, for fixedly connecting this collar thereto in an axially adjusted position and in an area that is located radially inward of the fulcruming rib 17 and axially back of and spaced from the latter.

The support collar 20 carries, or is provided on the leading side thereof with, a second circumambient fulcruming means, preferably also in the form of an annular rib 23 that is opposed to and axially-spaced from the first fulcruming rib 17 and preferably arranged coaxially about the body axis. The annular fulcruming rib 23 is located at a radial distance from the body axis different from the certain radial distance of location of the first fulcruming rib 17 and preferably is, for this purpose, of greater diameter than the first fulcruming rib 17.

It will be seen from FIGS. 2 and 3 that the opposed and axially-spaced fulcruming ribs 17 and 23 together with the body back end 13 and the leading side of the annular collar 20 define therebetween a transversely-arranged, circumambient indicator space 24 which has a radially-inward margin of a transverse dimension or diameter greater than that of the external cylindrical surface 22 of the extension 19, but which is appreciably less than the transverse dimension or diameter of the innermost located fulcruming rib 17, so as to define to radially opposite sides of the latter an inner zone 25 and an outer zone 26 of this indicator space.

A bi-stable, dished, Belleville indicator washer 27, which is preferably circular in outline, is provided, and it has a central hole 28, a concave side 29 and inner and outer circumambient zones 30 and 31 located on opposite sides of a transverse central plane (indicated by a broken line 32). The Belleville washer 27 is mounted in the annular indicator space 24, about the extension 19, with its opposite faces opposed respectively to the fulcruming ribs 17 and 23, and opposite the inner zone 30 thereof the back end 13 of the body 10 is annularly routed out at 33 radially inward of the fulcruming rib 17. The leading face of the annular collar 20 is obliquely relieved at 34 radially inward of its annular fulcruming rib 23. Thus the inner zone 25 of the indicator space 24 is appreciably wider than it is in the vicinity of the annular fulcruming ribs 17 and 23 to permit free deflection of the inner margin 30 of the bi-stable Belleville washer at its central hole 28, so as to avoid undesirable interference with its intended flexure back and forth through the transverse central plane 32 during indicating action. Radially outward of the annular fulcruming rib 23 the leading side of the annular collar 20 is also obliquely relieved at 35. As will be best understood from FIG. 3, the resulting annular frusto-conical surface may be cut back to assure sharp definition of line contact between this rib and the top face of the bi-stable Belleville washer 27, and to assure that the washer is entirely unstressed or freely stable in its initial position shown.

The parts of the washer embodiment of the preload indicating device 5 will be assembled and calibrated in the following manner. In the absence of the support collar 20 the bi-stable Belleville washer 27 will be dropped down over the body extension 19 and the support collar 20 will then be applied to the extension thereabove. The body 10 and its extension 19 will then be axially loaded toward a support surface to a predetermined preload for a particular intended service. As a result, the annular extension 19 to which the preload is applied will be thrust forward to deflect ahead of it the annular portion of the zone 15 that is aligned therewith, relative to the annular bearing land and its bearing face 14 that circumscribe this zone. Consequently, the inner annular section of the annular, set back surface zone 16 that is in alignment with the loaded body extension 19 is moved forward toward the support surface, and thus the plane of the annular bearing face 14, but short of contact with this surface. In practical forms of the washer embodiment 5, and others hereinafter described or which in the light of this disclosure will readily occur to one skilled in this art, the depth of the annular recess in the zone 15 which sets the surface zone 16 thereof back of the plane of the annular bearing face 14 may be about 0.010" to about 0.015". The resulting forward movement of the inner annular section of the surface zone 16 may be of the order of about 0.003" to 0.005", i.e., appreciably short of the plane of the annular bearing face 14. The dimensions of these features have been exaggerated in the drawings for clarity of the showings.

While the body 10 has such preload imposed thereon the collar 20 will be forced down about the annular extension 19 with a press fit until the bi-stable Belleville washer 27 snaps over center, i.e., its outer circumferential zone 29 will snap through the central transverse plane 32 to face contact or slap of its forward surface 31 against the frusto-conical stop surface 18. With the body 10 and its extension 19 loaded the outer zone 29 of the bi-stable Belleville washer 27 is then reset to its initial position shown in FIGS. 2 and 3 and held in this position as the load is released. Or the resetting of the Belleville washer 27 may be accomplished by placing the body 10 in a sleeve fixture with the outer edge of washer resting on the top end of the sleeve and applying a load to the body extension 19 until the washer snaps back to its initial position. For this latter purpose the bi-stable Belleville washer preferably is of a diameter greater than that of the body 10.

It will thus be seen that the simple acts of initially loading the body 10 and its extension 19 to the predetermined working load, and then, while they remain loaded, adjusting the longitudinal position of the support means or collar 20 down over the bi-stable Belleville washer 27 loosely carried on the extension to the point where this washer snaps over center and finally fixing this support means in the adjusted position such as by ceasing the advance of the press fit, assures efficient attainment of accurate calibration of the assembly. The resulting preload indicating device can thereafter be put in service with assurance of its reliability.

By the press fitting of the collar 20 down about the body extension 19 it is fixedly connected automatically in an axially adjusted position to the body back end 13 in a proper position for indicating attainment of predetermined preload in use as the parts of the assembly are tightened up to clamp together a plurality or pair of parts. If desired, this fixing of the support means or collar 20 upon the extension 19 in its adjusted position of calibration may be supplemented by electron beam welding. It is also to be understood that while a press fitting mount of the collar 20 about the body extension 19 may be preferred for attaining the fixed connection of the former in an axially adjusted position on the latter in a very simple manner, this adjusted mount may be accomplished in other ways, if desired, such as by an interference threaded mount thereon.

By way of illustration, advantageous use of the washer assembly 5, depicted in FIGS. 1 to 3 incl., may be attained for clamping together a pair of parts with the use of a stud, as is illustrated in FIG. 4. For example, it may be desired to clamp a part or plate 37 to a face of a part 39 by means of a stud 40. For this purpose the part 39 may have an internally-threaded hole 41 for threadably engaging therein threads 42 on the stud shank 43, which extends through a hole 38 in the plate 37. Before assembly a conventional flat washer 44 may be slipped over the stud shank 43 to abutment against the inner side of the stud head 45 for the usual purpose, and then the preload indicating washer of FIGS. 1 to 3 incl. will be slipped upon the shank. The stud shank 43 is inserted through the hole 38 in the plate 37 and threadably engaged within internally-threaded hole 41 in the part 39. The stud head 45 is then wrench turned threadably to advance the stud shank 43 into the part 39 so as to clamp the plate 37 to the latter and to apply proper preload force to the assembly. The axial imposition of the preload upon the washer body 10 causes the annular section 46 of the recess face 16, which flanks the washer bore 11, to deflect downwardly toward but short of the outer face of the plate part 37.

It will thus be seen that the application of such preloading force stresses and flexes the bi-stable washer 27 by virtue of the fact that such forward distortion of the annular zone of the body 10 and its extension 19, which flanks the bore 11, moves the collar 20 and its fulcruming rib 23 axially forward for approach of the latter toward the annular fulcruming rib 17 carried by the washer body 10. As a result, the bi-stable Belleville washer 27 snaps over to the full line position illustrated in FIG. 4. The attendant slap of the underface of the outer zone 31 of the Belleville washer 27 against the frusto-conical face 18 provides a clearly audible indication of attainment of the desired predetermined preload.

It is to be understood that while the use of the preload indicating washer assembly 5 of FIGS. 1 to 3 incl. is illustrated in FIG. 4 as being employed with a stud 40, no implication is intended thereby that its advantageous use is limited to employment with studs. The parts 37 and 39 may be clamped together with the use of a conventional bolt which has a shank that extends through aligned holes of these parts to receive on the externally-threaded, projecting end of this shank therebeyond a conventional nut.

Figure 5:
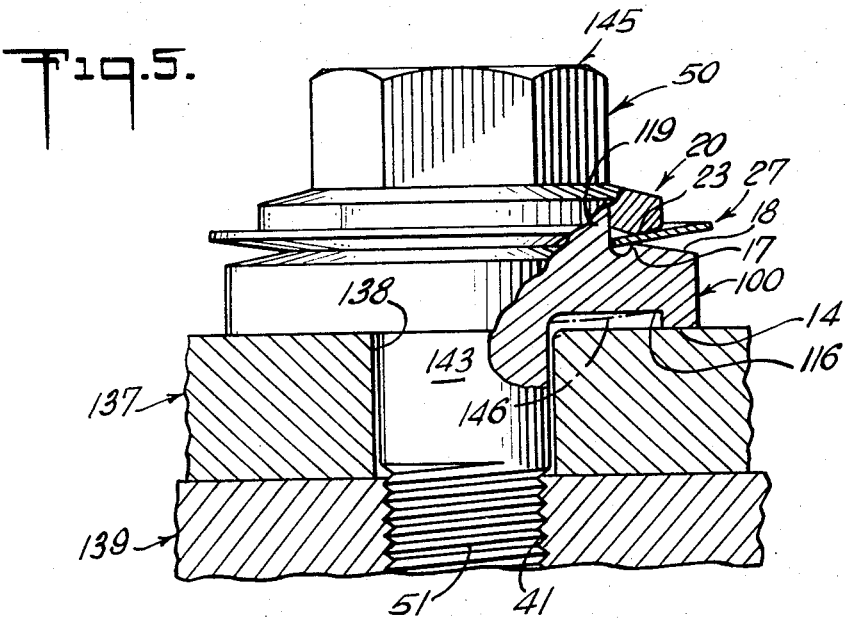
FIG. 5 is a view similar to FIG. 4, with parts broken away and in section, in which a modified form of the present preload indicating device is embodied in the head of a stud to be used to clamp a pair of parts together, the elements being depicted in their relative positions prior to application of preload.

It will be seen from FIG. 5 that the preload indicating device of the present invention may be embodied in the head of a fastening bolt or stud, such as that illustrated at 50. In this embodiment the bolt head 145 carries on its inner side, such as by being made integral therewith, the indicator body 100, which is in a form similar to the washer body 10 except that it has no through bore and its extension 119 is provided integrally with the bolt head 145 down over which the support ring 20 is slipped to a press fit about this extension. Further, the annular recess 116 which flanks the inner side of the annular bearing face 14 preferably terminates annularly on its inner side somewhat short of the bolt shank 143. With the bi-stable Belleville washer 27 set to its initial position illustrated in FIG. 5, in the manner indicated above, the stud shank 143 is inserted through the hole in the part 138 for threaded engagement of its externally-threaded section 51 in the internally-threaded hole 41 in the part 139. Axial advance of the stud shank 143 by wrenching of the stud head 145 forces the annular bearing face 14 against the outer face of the part 137 progressively to distort an annular zone of the body 100 in the vicinity of the root of the stud shank, to move forward an annular section of the recess face 116, indicated in dotted lines at 146, toward the outer face of the part 137. As a result, the fixed collar 20 and its fulcruming rib 23 are caused to advance toward the body fulcruming rib 17 so as to stress the bi-stable Belleville washer 27 and cause it to snap through center to slap the frusto-conical face 18 for producing an audible indication of attainment of the critical amount of preload.

Figure 6:
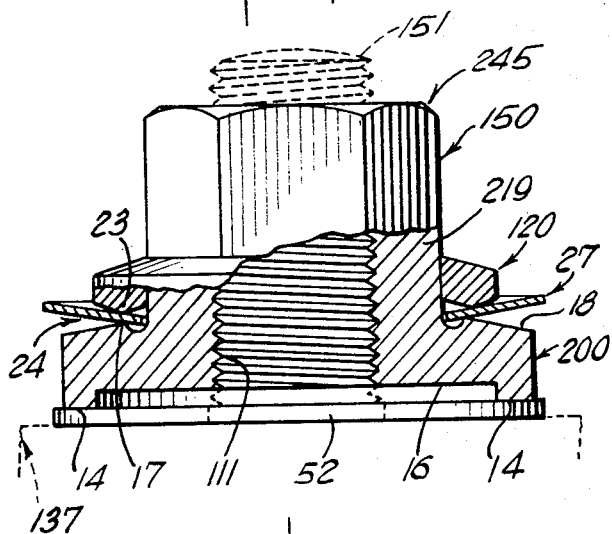
FIG. 6 is a side elevational view, with parts broken away and in section, of a further modified form of the present device as embodied in a nut threadably engaged upon the threaded end of a bolt shank (shown in dotted lines) for clamping parts together, prior to the application of sufficient preload axially to signal the attainment of the predtermined preload desired.

In FIG. 6 is illustrated a nut embodiment 150 of the preload indicating device of the present invention. In this embodiment the flatted section 245, to be engaged by the wrench, is subtended by the indicaaor body 200, preferably made integral therewith. The indicator body 200 is integrally connected to the flatted section 245 by an intervening extension 219 of the former, down over which the bi-stable Belleville washer 27 is dropped, followed by insertion of the flatted section 245 through the collar 20 and then press fitting the latter down about this intervening extension 219 for confining the Belleville washer in the annular space between it and the indicator body 200 with the fulcruming ribs 17 and 23 opposed to opposite faces of the Belleville washer, as shown. The leading end of the indicator body 200 is provided with the annular bearing face 14 and the annular recess 16 coaxially arranged about the internally-threaded bore 111 of this nut assembly, so as to provide a preload indicating device embodied within the nut structure. When the externally-threaded shank, indicated in broken lines at 151, of a bolt shank that extends through aligned holes in parts 137 and 139 to be clamped together is threadably engaged by the nut assembly and turned down its annular bearing face 14 will be brought to face engagement with a face of the outer part 137 or a conventional washer 52 resting thereon. Thereafter, when the nut assembly is wrenched down tight to effect the body distortion illustrated in FIG. 4 the bi-stable Belleville washer 27 will be stressed for similar flexure to attain the snap over center described above.

In FIG. 7 is shown a modified form of the washer embodiment illustrated in FIGS. 1 to 4 incl., parts of which are indicated in full lines in the unloaded condition resting upon a part 137 to be clamped by a fastener with the use of this modified form of preload indicating washer. The washer body 300 is of a construction similar to the construction of the washer body 10 of the first embodiment, except that the annular fulcruming rib 117 is located at a greater radial distance from the axis of the washer body. The axial extension 19 carries the annular collar 20 on the leading face of which is provided the opposing annular fulcruming rib 123. In this FIG. 7 embodiment this annular fulcruming rib 123 is located a radial distance from the axis of the washer body 300 that is less than the radial distance of location of the fulcruming rib 117. The bi-stable Belleville washer 27 is mounted in the annular space intervening the pair of opposed annular fulcruming ribs 117 and 123 in an initially inverted position when unstressed, i.e., it is cupped forward rather than backward. Preferably, in the FIG. 7 embodiment the relieved outer flanking surface 135 is frusto-conical and extends radially outward from the peak of the annular fulcruming rib 123 to provide the slap face for obtaining a clearly audible indication of imposition of the critical preloading force. It will thus be seen that the chief variations in the FIG. 7 embodiment in comparison with characteristic features of the FIGS. 1 to 4 incl. embodiment is the reversal of the relationship between the opposed annular fulcruming ribs 117 and 123 and the initial orientation of the cupped bi-stable Belleville washer 27. In the various embodiments the difference between the diameters of the opposed pair of fulcruming ribs, such as 17 and 23 or 117 and 123, preferably is small so as to embody the mechanical advantage thereof which provides the gross movement of the outer edge of the bi-stable Belleville washer 27.

In use of the FIG. 7 embodiment when the fastener that is to clamp the parts together is tightened load is applied in the direction of the arrow 53 to deflect an annular zone of the body 300 and its extension 19 adjacent to or flanking the through bore 11. As in the first embodiment of FIGS. 1 to 4 incl. an annular section of the recess face 16 is thus deflected toward the face of the adjacent part 137 in this flanking zone ultimately to limit this distortion to a previously calibrated amount. As is previously indicated this distortion moves forward the extension 19 and the collar 20 fixedly anchored thereon in its adjusted position. Consequently, the annular fulcruming rib 123 is moved forward relative to the annular fulcruming rib 117 so as to stress the bi-stable Belleville washer 27 and ultimately to cause it to flex through center for snap over to the broken line position 127 and slap against the frusto-conical surface 135 which has moved forward. The attendant observable change in shape of the bi-stable Belleville washer, due to this snap over to its broken line position 127 provides a visual indication of attainment of the critical preload, and the simultaneous audible snap and attendant slap of the Belleville washer provides a desirable supplemental audible indication thereof.

In FIG. 8 are illustrated the approximate load-deflection curves 55 and 56 which are respectively those of a constant load Belleville washer employed in the disclosure of the Ralston U.S. Patent No. 2,850,937 and of the bi-stable Belleville washer employed in the preload indicating devices of the present invention. FIG. 8 thus graphically illustrates the entirely different action of the indicator washer employed by Ralston and that of the bi-stable indicator washer embodied informs of the present invention. It is imperative to operation of the Ralston indicator that this difference exists. In the Ralston assembly it is necessary that the Belleville washer will not snap over center, i.e., it must be of the constant load type. As will be seen from the curve 56 in FIG. 8 the bi-stable Belleville washer, embodied in forms of the present invention, snaps over center to inverted orientation, i.e., it moves to a point 57 of negative deflection as it slaps against the stop for giving an audible signal, as well as visual and tactile indications of attainment of the proper preload stressing.

It is to be understood that, in the advantageous practice of the present invention, the circumambient bearing means, the pair of opposed fulcruming means, the support for the rearmost one of the latter that faces forward, and the stop means against which the stressed Belleville washer audibly slaps in snapping over as a predetermined mount of preloading force is applied, need not be continuous about the body axis, although continuity thereof preferred as a practical matter. For example, any one or more of such structures may be in the form of a series of localized elements which are arranged in annularly spaced relation, possibly as few as three located about 120° apart when provided with contact faces of appreciable length in the circumambient direction. While it is preferred that the support means be in the form of an annulus to permit initially simple unitary, axial adjustment thereof, it may comprise a series of separate units each individually fixedly connected in the desired axially adjusted position to the back end of the indicator body. Also, while it may be preferred that the shaping of the rear face of the shoulder on the back end of the indicator body and of the forward side of the stop means, which respectively carry one of the pair of fulcruming means, be such as to provide the latter with sharp edges for substantially line contact by opposite sides of the bi-stable Belleville washer this is not essential to practice of the present invention. Further, while in preferred embodiments stop surfaces flanking one or both of the fulcruming means, or the circumambient ribs which serve thereas, as frusto-conical any such stop surface or elements thereof may be arranged in a substantially transverse or radial plane when the opposed flanking surfaces are axially spaced therefrom sufficiently to allow the desired flexing action of the bi-stable Belleville washer zones. Although practical embodiments of the invention desirably employ these critical structures and the bi-stable Belleville washer in circular forms, preferably coaxially arranged with respect to each other, they may be in other operative forms, e.g., square or polygonal.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is the novel subject matter defined in the following claims.

I claim:

1. A preload indicating device for fasteners, such as of the bolt and stud types, each of which comprises an elongated fastener shank for clamping parts together, and a plurality of axially-spaced anchoring means associated with said shank for applying adjustable clamping load to such parts with a certain one of said clamping means comprising an unitary assembly of parts constituting any of a nut means, a bolt head means, a washer means, and the like; wherein the improvement is embodied in the certain one of said clamping means and comprises (1) a body of deflectable metallic material having opposite ends and an axis extending centrally therethrough in the direction of the clamping load to be applied, the leading one of said ends being arranged transversely, generally normal to this body axis and adapted to transfer clamping force to one such part, (a) said force transfer end having circumambient, part-opposed, bearing means circumscribing the body axis and spaced radially outward from the latter, and (b) a circumambient set back surface zone of appreciable radial width intervening said circumambient bearing means and the body axis spaced radially inward from and located axially back of said circumambient bearing means to be moved forward by a predetermined load deflection of said body toward the part opposed by said bearing means;

(2) means defining on the back other end of said body first circumambient fulcruming means circumscribing the body axis at a certain radial distance from the latter and extending rearwardly in the axial direction;

(3) an axial projection provided on the body back end of a transverse dimension less than the innermost fulcruming means of a pair thereof embodied in said unitary assembly in opposed relation which includes said first circumambient fulcruming means, with said projection having an end section extending rearwardly beyond this pair of fulcruming means;

(4) means defining about the body axis a transversely-arranged support means for second fulcruming means with this support means being fixedly mounted in an axially adjusted position upon said projection end section radially inward of said first fulcruming means and axially located back of and spaced from the latter, (a) said support means carrying on the leading side thereof a second circumambient fulcruming means in opposed and axially-spaced relation to said first fulcruming means and also circumscribed about the body axis at a radial distance from the latter different from the certain radial distance location of said first fulcruming means, said support means being adapted to move said second fulcruming means forward upon movement forward of said set back surface zone, and (b) said opposed and axially-spaced first and second circumambient fulcruming means and said body back end and support means together defining therebetween a transversely-arranged, circumambient indicator space having a radially-inward margin of a transverse dimension appreciably less than the transverse dimension of the innermost located fulcruming means to define to radially opposite sides of the latter an inner zone and an outer zone of said indicator space; and (5) a bi-stable, dished, Belleville indicator washer having a central hole, a concave side and inner and outer circumambient zones located on opposite sides of a transverse plane and mounted in the circumambient indicator space with opposite faces thereof opposed respectively to said first and second fulcruming means for transverse flexure of the inner and outer circumambient zones thereof toward the transverse plane and then for simultaneous snap of each through this plane to opposite sides thereof when stressed by predetermined preload imposed axially upon said body which moves said first and second fulcruming means axially toward each other.

2. The preload indicating device of claim 1 in which one of said body back end and the leading side of said support means is provided with stop means radially offset from the fulcruming means carried thereby and located in the path of one of said flexed zones of said Belleville washer for audible slap of the latter thereagainst when snapped through the transverse plane.

3. The preload indicating device of claim 2 in which said stop means is provided on the one of said body back end and said support means leading side that carries the radially innermost fulcruming means.

4. The preload indicating device of claim 2 wherein said stop means is in the form of a frusto-conical surface against which one of said zones of said Belleville washer will have appreciable surface contact when snapped over to the opposite side of the transverse plane.

5. The preload indicating device of claim 1 in which said circumambient bearing means and set back surface zone respectively are circular and are concentrically arranged about said body axis.

6. The preload indicating device of claim 1 in which said pair of circumambient fulcruming means respectively are circular and are concentrically arranged about said body axis.

7. The preload indicating device of claim 1 in which said support means is in the form of an annular collar mounted upon said projection end section with the latter spaced radially inward at an appreciable distance from the circumambient fulcruming means carried thereby, and said projection end section extends back through the Belleville washer hole with appreciable clearance and into said collar.

8. The preload indicating device of claim 7 in which said body back end is stepped to define said projection circumscribed at its base by an annular shoulder having a generally transversely extending rear face shaped to provide said first circumambient fulcruming means and a frusto-conical surface flanking the radially outer side of the latter, and in which said Belleville washer initially is concaved in the rearward direction whereby said frustoconical surface serves as a stop for audible engagement by the outer zone of said Belleville washer when the latter is snapped forward to the opposite side of said transverse plane by preload stressing.

9. A preload indicating device for fasteners, such as of the bolt and stud types, each of which comprises an elongated fastener shank for clamping parts together, and a plurality of axially-spaced anchoring means associated with said shank for applying adjustable clamping load to such parts with a certain one of said clamping means comprising any of a nut, a bolt head, a washer and the like; wherein the improvement is embodied in the certain one of said clamping means and comprises (1) a body of deflectable metallic material having opposite ends and an axis extending centrally therethrough in the direction of the clamping load to be applied, the leading one of said ends constituting a circular base section having a forward face arranged transversely, generally normal to this body axis and adapted to transfer clamping force to one such part, (a) said force transfer end having circumambient, part-opposed, bearing means in the form of a circular, axially-extending land coaxially circumscribing the body axis and spaced radially outward from the latter which provides a forward bearing edge, and (b) a substantially transversely-extending, annular set back surface zone of said face which is of appreciable radial width and is circumscribed by said circular bearing land with this surface zone located rearwardly of said bearing edge to be moved forward by a predetermined load deflection of said body toward the part opposed by said bearing edge;

(2) the back end of said body being annularly stepped to define a central, axially-extending projection that is arranged coaxially with respect to said base section in substantial alignment with said forward set back surface zone, and an annular shoulder coaxially circumscribed about the base of said projection, (a) the rearward face of this shoulder being so shaped as to provide a first circumambient fulcruming means in the form of a rearwardly-projecting, circular rib of certain diameter spaced radially outward at an appreciable distance from the base of said projection to define therebetween an inner annular shoulder zone of appreciable width and an outer frusto-conical, annular shoulder zone flanking the radially outer side of said fulcruming rib;

(3) support means in the form of an annular collar coaxially mounted upon said projection, (a) said support collar having a forward annular face so shaped as to provide a second circumambient fulcruming means in the form of a coaxial forwardly-projecting, circular rib spaced radially outward at a greater distance from said projection to define therebetween an inner annular collar zone of appreciable width with the diameter of said shoulder fulcruming rib being less than that of the collar fulcruming rib;

(b) said opposed and axially-spaced first and second circumambient fulcruming ribs and said shaped body shoulder and support collar faces together defining therebetween a transversely-arranged, annular indicator space having a radially-inward margin of a transverse dimension appreciably less than the transverse dimension of the radially innermost located fulcruming rib to define to radially opposite sides of the latter an inner zone and an outer zone of said indicator space; and (4) a bi-stable, dished, Belleville indicator washer having a central hole, a concave side and inner and outer annular zones located on opposite sides of a transverse plane with said washer in its initial unstressed condition being loosely telescoped upon said projection and mounted in the annular indicator space in a manner which opposes the face of its concave side to said collar fulcruming rib and its opposite forward face to said shoulder fulcruming rib, (a) said opposed inner annular shoulder and collar zones being axially spaced sufficiently to allow said inner zone of said Belleville washer to flex freely through the transverse plane therebetween with said outer washer zone initially being separated from said outer frusto-conical shoulder zone for slap against the latter in forward snap of said washer when stressed by predetermined preload imposed axially upon said body which moves said first and second fulcruming ribs axially toward each other.

References Cited

UNITED STATES PATENTS 2,850,937  9/1958  Ralston _____ 85—62

RAMON S. BRITTS, Primary Examiner